June 19, 1956     E. W. VON KNAUF ET AL     2,750,767
DEVICE FOR BUTTERING SWEET CORN
Filed April 19, 1952
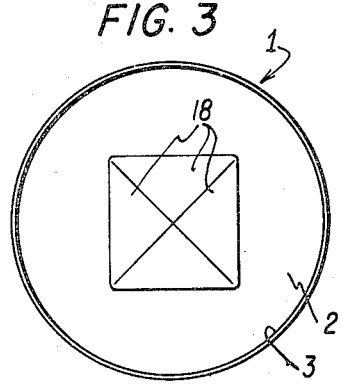
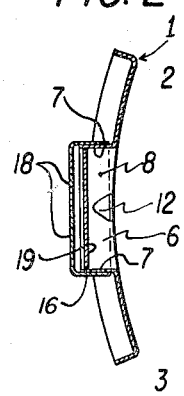
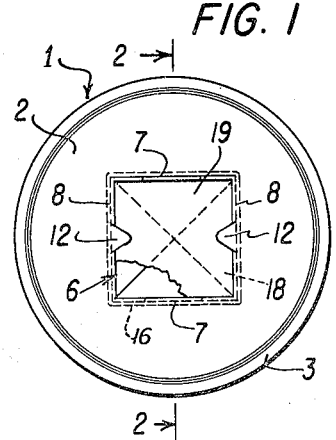
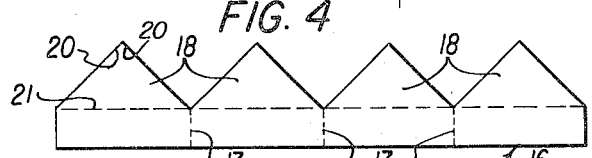
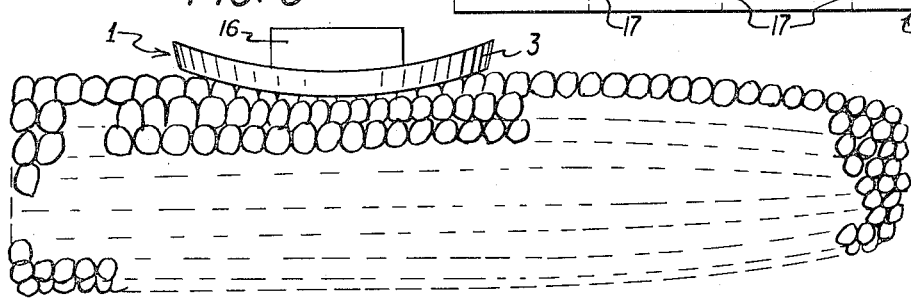
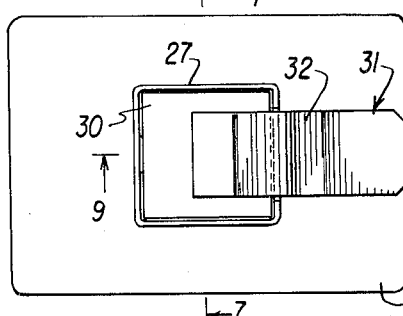
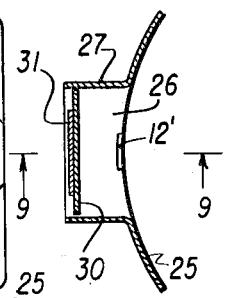
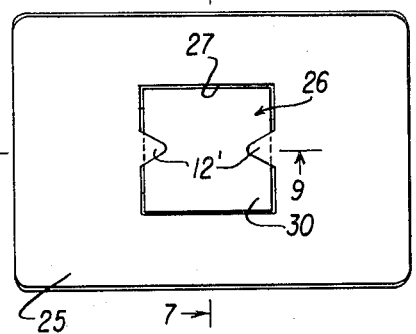
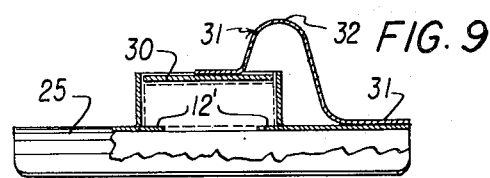
INVENTORS
Emil W. von Knauf
Arthur Melman
BY Morris Spector
Atty.

United States Patent Office 2,750,767
Patented June 19, 1956

2,750,767
DEVICE FOR BUTTERING SWEET CORN

Emil W. Von Knauf, Ringwood, and Arthur Melman, Chicago, Ill.

Application April 19, 1952, Serial No. 283,228

3 Claims. (Cl. 65—12)

This invention relates to a device for facilitating the spreading of butter on corn on the cob.

When a pat of butter is placed on an ear of hot corn, preparatory to the spreading of butter, the butter commences to melt and slide down the corn out of control of the butter knife, as is familiar to all who have attempted such spreading operations. It is one of the objects of the present invention to provide an apparatus for receiving a pat of butter to be spread on an ear of corn and confining it as the butter is being spread. It is a further object of the present invention to provide an apparatus wherein the confined pat of butter that is being spread over the corn may be manually pressed towards the corn to facilitate the spreading action.

It is a still further object of the present invention to provide a butter spreading device which will hold a pat of butter against dropping out of the device when the device is inverted, as may be desirable preparatory to and during the spreading operation. It is another object of the present invention to provide an applicator for applying butter to an ear of corn wherein the applicator may be positioned with the butter side thereof against the corn and the applicator may then be moved along the surface of an ear of corn for spreading the butter thereon, and wherein the butter will be applied to the corn whether the butter applying surface of the applicator faces upwardly or downwardly. Another object of the present invention is to provide a butter applicator that will hold a pat of butter and will spread melted butter as the applicator moves along the corn or other object being buttered.

It is a still further object of the present invention to provide a butter applicator wherein the butter may be pressed towards the article being buttered without soiling the fingers of the person spreading the butter.

It is a still further object of the present invention to provide a device of the above mentioned character which is so economical of construction that it can be sold at a price sufficiently low to permit discarding of the device after a single use.

The attainment of the above and further objects of the present invention will be apparent from the following specification taken in conjunction with the accompanying drawing forming a part thereof.

In the drawing:

Figure 1 is a top plan view of a butter spreading device embodying the present invention;

Figure 2 is a longitudinal sectional view taken along the line 2—2 of Figure 1;

Figure 3 is a bottom plan view of the device of Figure 1;

Figure 4 is a plan view of one of the strips used in making the spreader of Figure 1;

Figure 5 is a side view of the device of Figure 1 shown in its butter-spreading position;

Figure 6 is a top view illustrating an alternative construction;

Figure 7 is a view taken along the line 7—7 of Figure 6;

Figure 8 is a bottom plan view of the device of Figure 6; and

Figure 9 is a longitudinal sectional view taken along the line 9—9 of Figure 6 and illustrating the device in inverted or useable position.

Reference may now be had more particularly to the drawing wherein like reference numerals designate like parts throughout.

In Figures 1 through 4 there is shown at 1 a disposable butter spreader for spreading butter onto corn on the cob, which spreader embodies the present invention. The spreader of Figure 1 is made entirely of paper which may be treated to render it moisture-proof and to inhibit its ability to absorb butter fat. This treatment may consist in coating of the paper with wax of the type which has a substantially higher melting point than the temperature encountered in use of the spreader.

The spreader 1 comprises a circular disc of paper that is formed with a smooth butter-spreading top 2 that is concave to conform in shape with the shape of a portion of a cylinder of a radius approximating that found in average sized ears of corn. The top 2 constitutes a butter applicator. The top 2 has a flange 3 formed around its periphery which flange not only strengthens the spreader 1 but, in addition, serves as a means for facilitating gripping of the butter spreader.

At the center the paper 1 is cut to form a rectangular butter-receiving hole, and the paper surrounding the hole is pressed rearwardly to form two downwardly projecting wings 7—7 on one side of the rectangle and two more wings 8—8 on the other side of the rectangle. Each of the wings 8—8 has a tab 12 struck therefrom that remains contiguous with the surface 2, said tab thereby overhanging the opening formed by the wings 7—7 and 8—8. The wings 7—7 and 8—8 are then held in position by a band of paper such as shown in Figure 4, which band is wrapped around and glued to the outside of the downwardly folded wings 7—7 and 8—8. The band of paper of Figure 4 includes a narrow strip 16 of a length equal to the perimeter of the opening formed by the bent wings 7—7 and 8—8, which strip has fold lines 17 and 21 formed thereon. The strip 16 is of a height approximately equal to the height of the folded wings 7—7 and 8—8. The fold lines 17 divide the strip 16 into four equal lengths each of which has a flap 18 projecting therefrom and adapted to be folded along the line 21. Each flap is of the shape of a right angled isosceles triangle so that the tabs 18—18 when folded form a continuous surface, with the right angle corners 20 thereof meeting, as illustrated in Figure 3. This forms a closure for the bottom of the butter-receiving compartment 6. This bottom consists of the four flaps 18. An auxiliary bottom 19 consisting of a rectangular piece of paper is fitted into the butter well trough 6.

In use, a pat of butter is placed into the trough 6 and forced past the tabs 12—12, which then spring back under their own resiliency to overlie the pat of butter and keep it from falling out when the holder is inverted. The holder is then inverted and placed upon an ear of corn, as illustrated in Figure 5. The operator, holding the spreader at the flange 3, can then press his finger at the center of the butter holder, thus pressing the four flaps 18 downwardly and pressing the cardboard bottom 19 downwardly to force the butter into contact with the ear of corn. The butter holder is then shifted along the ear of corn at the same time that the pat of butter is being pressed towards the kernels of corn, thus spreading the butter over the corn.

In Figures 6 through 9 there is shown an alternative construction. The device of these figures is intended to be reused rather than of the single use disposable type previously described. The butter spreader of Figure 6 may comprise an arched or concave sheet 25 of plastic material that has a rectangular butter-receiving well 26 formed therein, which well is surrounded by a neck 27 and is provided with overhanging tabs 12' that correspond to the tabs 12 of Figure 1. The open bottom of the neck 27 is closed by a rectangular piece of plastic 30 that fits snugly within the neck and is slidable therein, said piece of plastic 30 being secured to a resilient plastic strip 31 that is cemented or otherwise secured to the sheet 25. The strip 31 is resilient and includes a gooseneck 32 which permits the strip to flex as the piece of plastic 30 is forced inwardly of the neck to push a previously inserted pat of butter into contact with the ear of corn along which the spreader is being moved. When the digital pressure on the piece 30 is released the strip 31 moves back under its own resiliency to the position illustrated in Figures 7 and 9. A slight overhang on the rear of the neck 27 prevents rearward retraction of the piece 30.

In compliance with the patent statutes there have here been shown preferred embodiments of the present invention. It is, however, to be understood that the invention is not limited to the precise constructions here shown, the same being merely illustrative of the principles of the invention. What is considered new and desired to be secured by Letters Patent is:

1. A device for spreading butter on corn on the cob, said device comprising a body concave to conform in shape to the shape of a portion of the surface of an ear of corn and having a butter-receiving well open at the top to receive a pat of butter, said well having a bottom which is movable towards the top of the well so that upon inversion of the device with the top of the butter-receiving well facing downwardly onto an ear of corn said bottom can be pushed towards the ear of corn to force any butter that may be therein towards the ear of corn, means forming a flexible finger-receiving backing for said bottom to receive a finger of the operator of the device for moving said bottom towards said top and resilient means overhanging the open end of the butter receiving well for retaining a pat of butter within the well and being adapted to bend inwardly to enable a pat of butter to be freely inserted in the well opening.

2. A disposable device for spreading butter on corn on the cob, said device comprising a paper body having a concave portion adapted to conform to the shape of the surface of an ear of corn, a butter receiving well in said paper body defined by rearwardly extending walls thereon, said well opening into said concave body portion and adapted to receive a pat of butter, a member slidable in said well and adapted to abut the rear face of a pat of butter within said well, means for moving said member toward said open end of said well comprising a backing member connected to the walls of said well, said backing member having inwardly bendable flexible flaps bridging the rear end of said well for receiving the finger of an operator to move said member toward the open end of said well.

3. A disposable device for spreading butter on corn on the cob, said device comprising a paper body having a concave portion adapted to conform to the shape of the surface of an ear of corn, a butter receiving well in said paper body defined by rearwardly extending walls thereon, said well opening into said concave body portion and adapted to receive a pat of butter, a member slidable in said well and adapted to abut the rear face of a pat of butter within said well, means for moving said member toward said open end of said well comprising a backing member connected to the walls of said well, said backing member having inwardly bendable flexible flaps bridging the rear end of said well for receiving the finger of an operator to move said member toward the end of said well, and resilient tabs overhanging the open end of the butter receiving well for retaining a pat of butter within the well and being adapted to bend inwardly to enable a pat of butter to be freely inserted in the well opening.

References Cited in the file of this patent

UNITED STATES PATENTS

| Number | Name | Date |
|---|---|---|
| 1,246,624 | Lundahl | Nov. 13, 1917 |
| 1,253,917 | Wern | Jan. 15, 1918 |
| 1,767,313 | Salvucci | June 24, 1930 |
| 1,893,889 | Guerini | Jan. 10, 1933 |
| 2,458,120 | Volpini | Jan. 4, 1949 |
| 2,478,122 | Mossel | Aug. 2, 1949 |
| 2,527,149 | Peterson | Oct. 24, 1950 |
| 2,565,874 | Mossel | Aug. 28, 1951 |
| 2,581,745 | Amorino et al. | Jan. 8, 1952 |